US 8,442,959 B2
May 14, 2013

(12) United States Patent
Sebastian

(54) METHODS AND SYSTEMS FOR AUTOMATED PROCESSING OF FALLOUT ORDERS

(75) Inventor: Sachith Sebastian, Carrollton, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 727 days.

(21) Appl. No.: 11/959,651

(22) Filed: Dec. 19, 2007

(65) Prior Publication Data

US 2009/0164833 A1    Jun. 25, 2009

(51) Int. Cl.
  *G06F 7/00* (2006.01)
  *G06F 17/00* (2006.01)

(52) U.S. Cl.
  USPC .......................................... 707/694; 707/703

(58) Field of Classification Search .................. 707/694, 707/703; 705/8, 26
See application file for complete search history.

(56) References Cited

U.S. PATENT DOCUMENTS

| | | | | |
|---|---|---|---|---|
| 5,235,702 A * | 8/1993 | Miller | ............................ | 707/102 |
| 5,862,325 A * | 1/1999 | Reed et al. | ..................... | 709/201 |
| 5,991,751 A * | 11/1999 | Rivette et al. | ..................... | 707/1 |
| 6,341,359 B1 * | 1/2002 | Aiken et al. | .................... | 714/100 |
| 6,434,568 B1 * | 8/2002 | Bowman-Amuah | ...... | 707/103 R |
| 6,625,651 B1 * | 9/2003 | Swartz et al. | .................. | 709/226 |
| 6,782,388 B2 * | 8/2004 | Majewski et al. | ............... | 707/10 |
| 6,829,611 B2 * | 12/2004 | Majewski et al. | ............... | 707/10 |
| 6,961,865 B1 * | 11/2005 | Ganesh et al. | .................... | 714/2 |
| 7,437,668 B2 * | 10/2008 | Slein | ............................. | 715/255 |
| 2005/0102192 A1 * | 5/2005 | Gerrits et al. | .................. | 705/26 |
| 2005/0144527 A1 * | 6/2005 | Haas et al. | ...................... | 714/38 |
| 2005/0283675 A1 * | 12/2005 | Krebs | ............................ | 714/38 |
| 2006/0059145 A1 * | 3/2006 | Henschke et al. | ................ | 707/6 |
| 2007/0150480 A1 * | 6/2007 | Hwang et al. | .................. | 707/10 |
| 2007/0233754 A1 * | 10/2007 | Baeuerle et al. | ............. | 707/203 |
| 2009/0106242 A1 * | 4/2009 | McGrew et al. | ................. | 707/6 |

* cited by examiner

*Primary Examiner* — James Trujillo
*Assistant Examiner* — Pavan Mamillapalli

(57) ABSTRACT

A system and method may include receiving an order and an error identifier, indexing a database based on the error identifier to identify a rule identifier, and indexing the database based on the rule identifier to identify a rule. The system and method may further include applying the rule to modify the order to generate a modified order, and submitting the modified order for processing.

26 Claims, 9 Drawing Sheets

| Rule ID | RuleDescription | RuleAction | Rule Error Description | Rule Status | Rule Created Date |
|---|---|---|---|---|---|
| 1 | orderinfo | Add | No input data | Y | 09/24/2007 |
| ... | | | | | |
| 101 | quantity | Change | Product is not eligible | Y | 10/10/2007 |

Figure 4

| Rule ID | Add To | Change From | Change To | Change Value By | Delete To | Value | Tag After | Service ID | Seq. | Look For | Order Type | Voice Order Type | Data Order Type | Video Order Type | Order Signals |
|---|---|---|---|---|---|---|---|---|---|---|---|---|---|---|---|
| 1 | voice Order Type | Null | Null | Null | Null | master Order Type | order Info | 3 | 0 | Null | Null | Null | Null | Null | Null |
| ... | | | | | | | | | | | | | | | |
| 101 | Null | G9602 | G9601 | Null | Null | Null | Products | 3 | 0 | Null | Null | Null | Null | Null | Null |

Figure 5

METHODS AND SYSTEMS FOR AUTOMATED PROCESSING OF FALLOUT ORDERS

BACKGROUND INFORMATION

Service providers attempt to process orders for goods and/or services from their customers in an efficient manner. Computers have been used to reduce the amount of people required to process an order. Problems may occur when the information placed in an order received at a front end computer has a discrepancy with back end automated systems that process the order, thus resulting in an order falling out of processing by the automated systems. In these situations, a human operator is then involved in manually correcting and returning these orders to the automated systems for processing. Problems exist with such a correction mechanism in that the errors are not corrected in real-time, which may lead to the service provider being late in providing the consumer with the requested service and/or good.

BRIEF DESCRIPTION OF THE DRAWINGS

Purposes and advantages of the exemplary embodiments will be apparent to those of ordinary skill in the art from the following detailed description in conjunction with the appended drawings in which like reference characters are used to indicate like elements, and in which:

FIG. 4 illustrates error description table entries in an error description table in accordance with exemplary embodiments;

FIG. 5 illustrates rule dictionary table entries in a rule dictionary table in accordance with exemplary embodiments;

These and other embodiments and advantages will become apparent from the following detailed description, taken in conjunction with the accompanying drawings, illustrating by way of example the principles of the various exemplary embodiments.

DETAILED DESCRIPTION OF EXEMPLARY EMBODIMENTS

A system and method in accordance with exemplary embodiments may include receiving an order and an error identifier, indexing a database based on the error identifier to identify a rule identifier, and indexing the database based on the rule identifier to identify a rule. The system and method may further include applying the rule to modify the order to generate a modified order, and submitting the modified order for processing.

The description below describes servers, modules, and network elements that may include one or more modules, some of which are explicitly shown, others are not. As used herein, the term "module" may be understood to refer to software, firmware, hardware, and/or various combinations thereof. It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices. It is further noted that the software described herein may be tangibly embodied in one or more physical media, such as, but not limited to, a compact disc (CD), a digital versatile disc (DVD), a floppy disk, a hard drive, read only memory (ROM), random access memory (RAM), as well as other physical media capable of storing software, and/or combinations thereof. Moreover, the figures illustrate various components (e.g., servers, network elements, modules, etc.) separately. The functions described as being performed at various components may be performed at other components, and the various components may be combined and/or separated. Other modifications also may be made.

Figure 1:
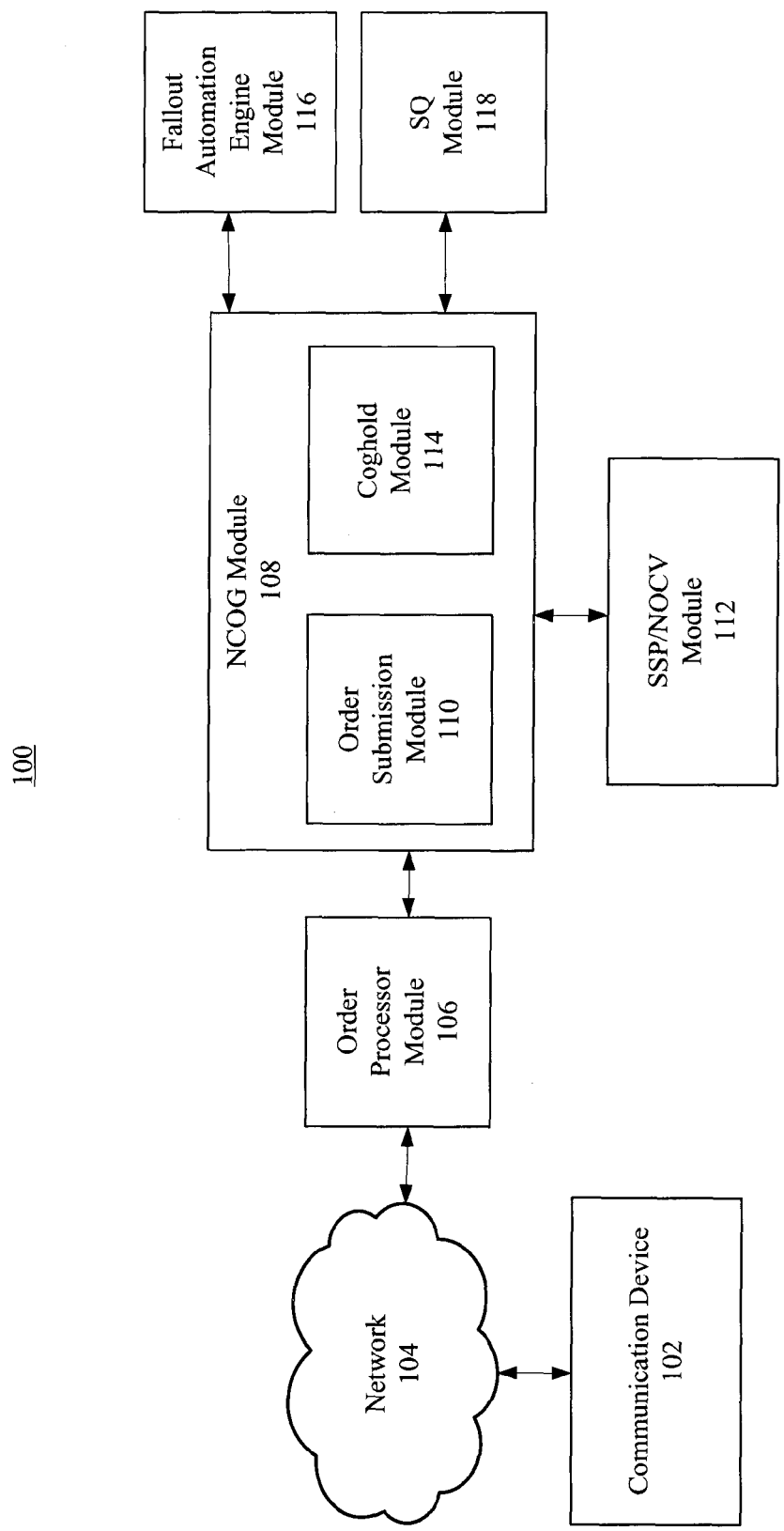
FIG. 1 illustrates a system in accordance with exemplary embodiments.

FIG. 1 illustrates a system in accordance with exemplary embodiments. The system 100 may provide a fallout prevention mechanism that reduces the turn-around time on orders having errors (i.e., "fallout orders") in substantially real-time (e.g., at processing speeds of computer processors), cutting down information technology (IT) expenditure, and ensuring that customer commitments are met. It is noted that system 100 illustrates a simplified view of various components included in a system to reduce order fallout, and that other hardware devices and software not depicted may be included in the system 100. It is also noted that the system 100 illustrates only a single or a few instances of various devices. It will be appreciated that multiple instances of these devices may be used. Moreover, the system 100 may include other devices not depicted in FIG. 1.

In an exemplary embodiment, a customer may use a communication device 102 to communicate with an order processor module 106 via network 104 to submit an order for a good and/or service. The communication device 102 may be a telephone, a mobile phone, a wireless phone, a computer, a personal digital assistant (PDA), a smart telephone, or another device capable of communicating via a network. The network 104 may be a wired network, a wireless network, or combinations thereof. For example, the network 104 may be a telephony network, such as, but not limited to a PSTN network. The network 104 also may be a data network, such as, but not limited to, the Internet.

The order processor module 106 may include an enterprise application useable by Customer Service Representatives (CSR) to take orders from customers and/or to process customer queries on services and billing. In an exemplary embodiment, the order processor module 106 may be a Convergent Front-End Engine (CoFEE). The order processor module 106 also may permit customers to submit orders via a data network (e.g., the Internet) with or without interacting with the CSR. Other order processing modules instead of or in addition to CoFEE may be used.

The order processor module 106 may create an order based on information received from a customer using the communication device 102. In an exemplary embodiment, the order processor module 106 may present a graphical user interface (not shown) to the Customer Service Representative (CSR), where the CSR may enter various types of information in fields of the graphical user interface that may be included in the order. The order may include information such as, but not limited to, customer information, product information, billing information, and telephone numbers. The order may be an electronic document that may be used to request a particular service, such as, but not limited to, a telephone service, a data service (e.g., DSL), a video service (e.g., cable television), goods, combinations thereof, and/or other types of services and/or goods. In an exemplary embodiment, the order may be an XML document having due date, tax information, directory information, address information, and billing information. The order also may be a text document. Once the order processor module 106 has received the information associated with the customer, the order processor module 106 may communicate the order to a Common Ordering Gateway (COG) module 108.

The COG module 108 may split the order content and send the split order content to different backend systems for processing. During account retrieval, the COG module 108 may merge the order content from various systems and provide a single view of the merged order content to the front end system. The COG module 108 may receive the order at an order submission module 110. The order submission module 110 may submit the order to a Strategic System Plan/National Order Collection Vehicle (SSP/NOCV) module 112, e.g., an order handling system. The SSP/NOCV module 112 can be the culmination of backend systems which dispenses the order content to one or more provisioning systems.

The SSP/NOCV module 112 may be a processing server to process the order to arrange for a requested service and/or goods to be provided to the customer. If the SSP/NOCV module 112 identifies an error in the order, the SSP/NOCV module 112 may communicate the order and error information to the Coghold module 114. The Coghold module 114 may attempt to resolve one or more errors (e.g., the order is delayed or held until the one or more errors are corrected). The error information may include an error identifier that may be used to identify a rule for modifying the order in an attempt to correct the error. The error identifier or description may be used as a search element in a rules database to obtain an index of the error identifier, e.g., to obtain the logical rules associated with the error identifier. The error identifier may be a sequence of numbers, letters, symbols, and/or combinations thereof that may be used to index a database. Error detection may be based on logical rules which are programmed into or accessed by the SSP/NOCV module 112. Using the logical rules, the SSP/NOCV module 112 may review parameters associated with an order and determine if the order is in accordance with the logical rules. For example, the rules may require certain fields in an order to be filled in and a field may not be filled in, a certain field may require numbers and letters are entered, a certain field may require a specific number of digits, the entered data does not reach the specified number of digits, the age of the purchaser may not meet a specified age requirement based on the type of product being purchased.

The first time that an error associated with the order occurs, the Coghold module 114 may communicate the order and the error information to a Fallout Automation Engine (FAE) module 116 to modify the order in an attempt to correct the error. The FAE module 116 may analyze a database to modify the order in an attempt to correct the error, as will be discussed in further detail below, and may submit the modified order to the order submission module 110 for submission of the modified order to the SSP/NOCV module 112 for processing the order. Thus, the FAE module 116 advantageously may revise the order in an attempt to correct the error without involving a human operator.

If the order was previously submitted to and modified by the FAE module 116, and the SSP/NOCV module 112 identified a new error after processing the modified order, the Coghold module 114 may communicate the modified order and new error information to a FAE module 116 to further modify the previously modified order in an attempt to correct the new error. Orders associated with new error information (i.e., error information that differs from the error information previously submitted to the FAE module 116) may be resubmitted to the FAE module 116 to permit further modification of the order. If the order was previously submitted to the FAE module 116 and the SSP/NOCV module 112 generates the same error information after processing the modified order, the Coghold module 114 may communicate the modified order to a Shadow Queue (SQ) module 118 to permit a human operator to attempt to correct the error. In some embodiments, after correcting a first error, the FAE module 116 may correct a second (different) error that occurs during processing before permitting a human operator to attempt to correct the second error via the SQ module 118. For example, if an order does not have a customer name, a human operator may identify the customer name and process the order. The FAE module 116 is further discussed below with reference to FIG. 2.

Figure 2:
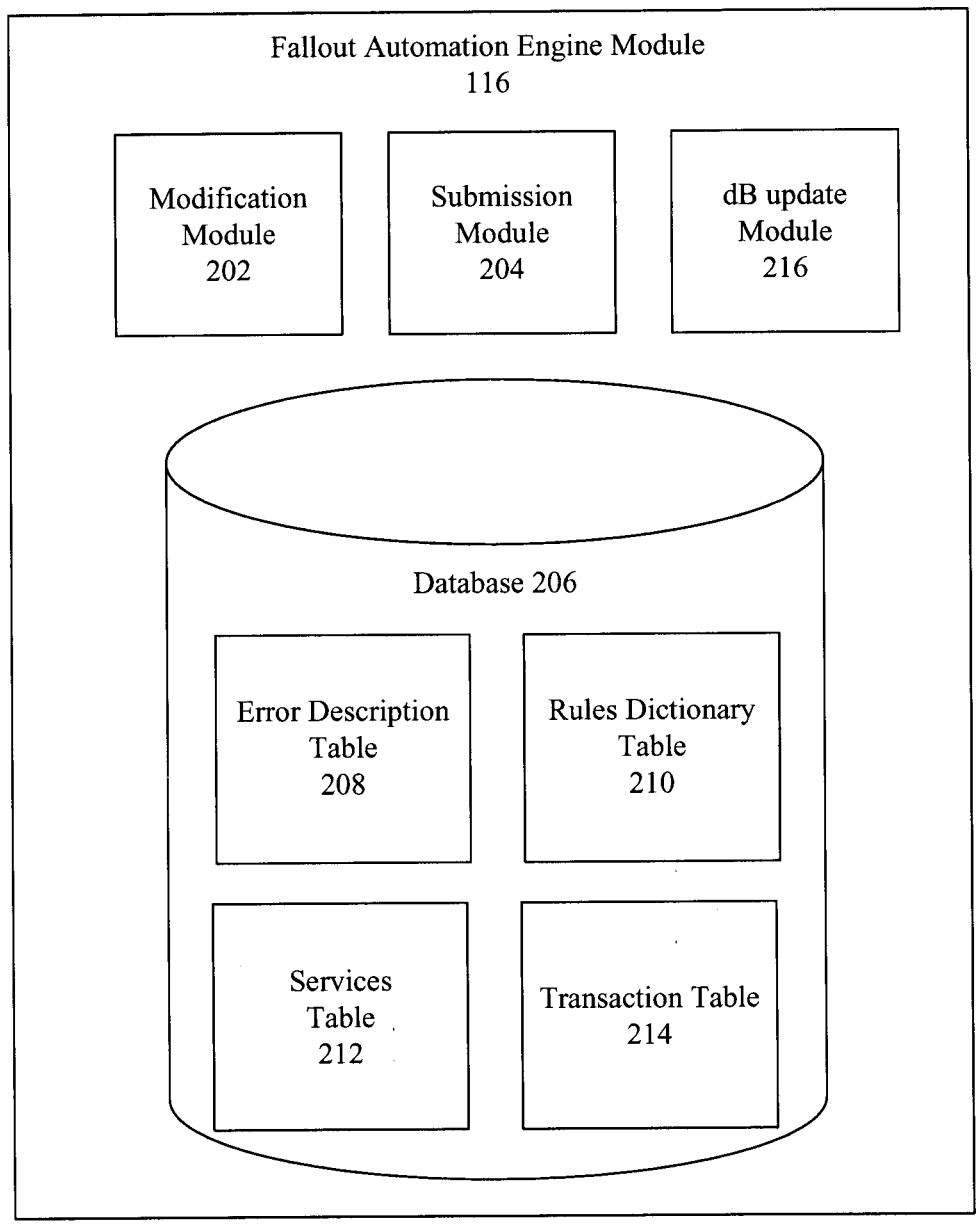
FIG. 2 illustrates various components of a Fallout Automation Engine (FAE) module in accordance with exemplary embodiments.

FIG. 2 illustrates various components of the Fallout Automation Engine (FAE) module in accordance with exemplary embodiments. In an exemplary embodiment, the FAE module 116 may include a modification module 202, a submission module 204, a database 206, and a database update module 216. It is noted that the modification module 202, the submission module 204, and the database update module 216 are exemplary. The functions performed by the modification module 202, the submission module 204, and the database update module 216 may be performed by other modules remote or local to the FAE module 116. The modification module 202, the submission module 204, and the database update module 216 also may be combined and/or separated.

The modification module 202 may receive the order and the error information associated with the order from the Coghold module 114. The error information may include an error identifier, which may be used to index a table in the database 206. The modification module 202 may query the database 206 using the error identifier to identify a rule to apply for modifying the order in an attempt to automatically correct the error.

In an exemplary embodiment, the database 206 may include an error description table 208, a rules dictionary table 210, a services table 212, and a transaction table 214. It is noted that the tables 208, 210, 212, and 214 are exemplary, and may be combined and/or separated. The tables 208, 210, 212, and 214 also may be stored in one or more databases that may be local or remote to one another.

The services table 212 may store a unique identifier for every good and/or service (e.g., service options) that is available to the customer. The unique identifiers may help to identify which rule to execute to correct the order. For example, specific information may be required to complete an order and the unique identifier can be used to identify incomplete or erroneously entered information (e.g., only nine digit telephone number when ten digits are required). The transaction table 214 may log information about the orders that the FAE module 116 received and modified. By logging the transactions, reports may be generated, orders may be tracked, and statistics may be generated (e.g., total number of orders).

The modification module 202 may use the error identifier to index the error description table 208 in the database 206 to identify an error description table entry. The error description table entry may include a rule identifier (rule ID) associated with the error identifier. The rule identifier (rule ID) may be used to index the rules dictionary table 210 to identify a rules dictionary table entry. The rules dictionary table entry may include a rule associated with the rule ID. The rule may identify an action to be applied to modify the order. Once the rule is identified, the database 206 may return the rule to the modification module 202. The modification module 202 may then apply the action to the order to modify the order.

After modification module 202 has modified the order, the modification module 202 may communicate the modified order to the submission module 204. The submission module 204 may submit the modified order to the order submission module 110, which may communicate the modified order to the SSP/NOCV module 112 for processing. If the SSP/NOCV module 112 is unable to process the modified order because a new error is encountered, the SSP/NOCV module 112 may communicate the modified order and new error information to the Coghold module 114. The Coghold module 114 may then forward the modified order and the new error information to the FAE module 116 to identify a new rule to further modify the order. If the SSP/NOCV module 112 is unable to process the modified order because the same error is encountered, the SSP/NOCV module 112 may communicate the modified order and the error information to the Coghold module 114. The Coghold module 114 may then forward the modified order and the error information to the SQ module 118 to permit a human operator to attempt to correct the error to allow the SSP/NOCV module 112 to process the order.

The FAE module 116 also may include a database update module 216. The database update module 216 may be used to update data stored in the error description table 208, the rules dictionary table 210, the services table 212, and/or the transaction table 214. As new errors are identified, a programmer may create new rules to handle errors identified in the orders. The programmer may create code to modify the new errors, and the programmer's computer (not shown) may communicate table updates to the database update module 216. The database update module 216 may then store the table updates in the database 206.

Updating tables in the database 206 is advantageous as compared with conventional systems. In conventional systems, new code would have to be written and recompiled to add new rules and/or to update existing rules, which may take a significant amount of time. Updating tables in the database 206, in contrast, can result in significant time savings because the tables are updated without involving updates to the code. The FAE module 116 may rely on the same computer code for accessing and processing the rules without requiring recompilation. The computer code of the FAE module 116 may receive a new error identifier, which may be used to index the tables in the database 206, and may modify the order based on a new rule retrieved from the database 206. In effect, the FAE module 116 may adapt to new rules and/or rule updates more quickly than in a non-table based system. A relationship between the entries of the error description table 208, the rules dictionary table 210, the services table 212, and the transaction table 214 in the database 206 are described in further detail below.

Figure 3:
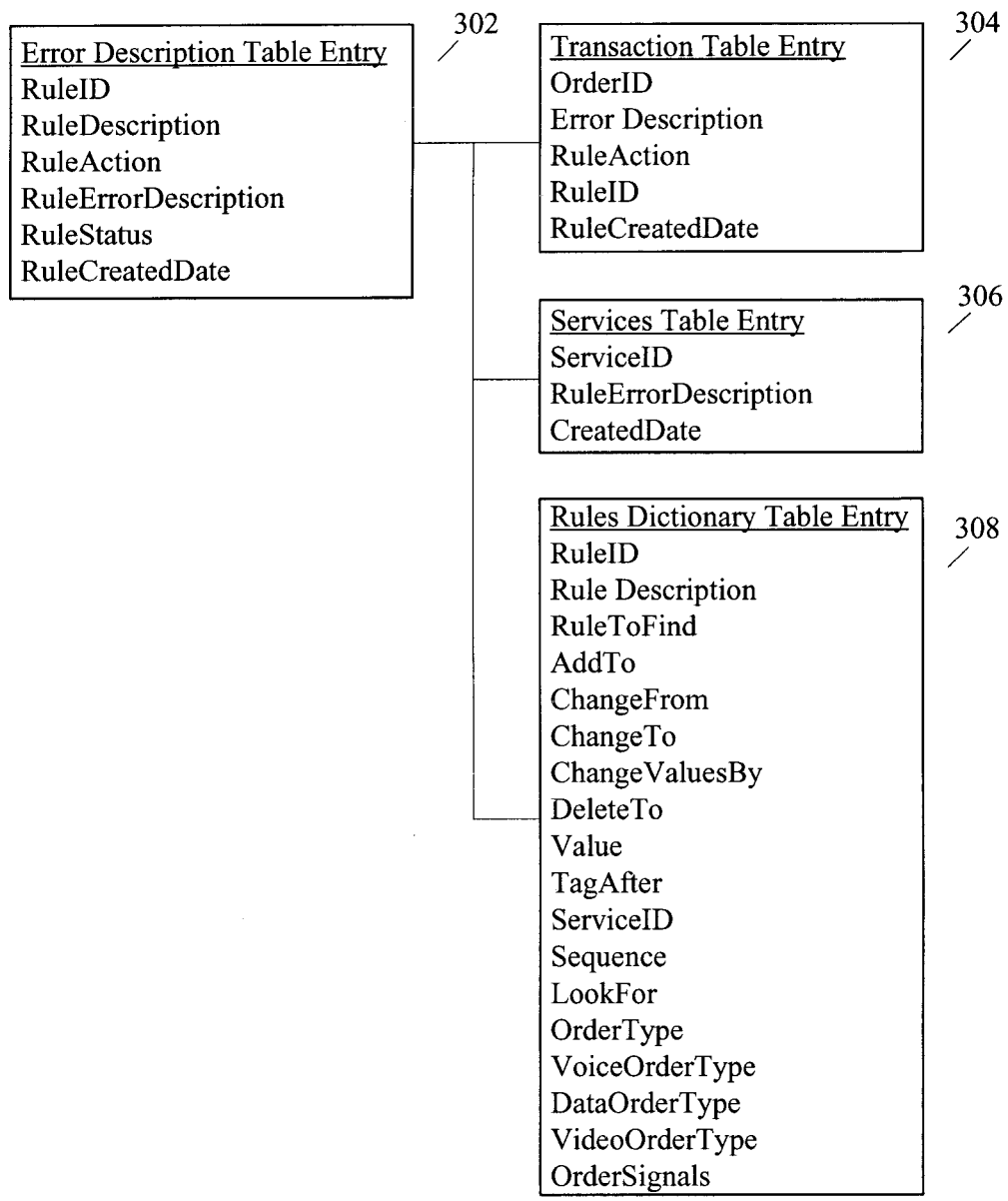
FIG. 3 illustrates a relationship between entries of an error description table, a rules dictionary table, a services table, and a transaction table in accordance with exemplary embodiments.

FIG. 3 illustrates a relationship between entries of an error description table, a rules dictionary table, a services table, and a transaction table in accordance with exemplary embodiments. Once the error identifier is obtained from the error information, the modification module 202 may index the error description table entry 302 based on the error identifier to obtain information from the transaction table entry 304, the services table entry 306, and the rules dictionary table entry 308. It is noted that FIG. 3 is exemplary, and the entries of the error description table 208, the rules dictionary table 210, the services table 212, and the transaction table 214 may have other relationships therebetween. Various fields of the error description table entry 302, the transaction table entry 304, the services table entry 306, and the rules dictionary table entry 308 are discussed in further detail below.

In an exemplary embodiment, the error description table entry 302 may include a RuleID field, a RuleDescription field, a RuleAction field, a RuleErrorDescription field, a RuleStatus field, and a RuleCreatedDate field. The RuleID field may include a rule identifier that may be used to index the rules dictionary table 210 to identify a rule dictionary table entry, which may include a rule associated with an action (e.g., add, delete, change, etc.). The RuleDescription field may include a description of the rule and a description of the action associated with the rule. The RuleAction field may identify the action to be applied to the order to modify the order (e.g., add an element, delete an element, change an element, etc.). The ErrorDescription field may include a description of the error identified by the SSP/NOCV module 112. The RuleStatus field may be indicate whether the rule is active. In an exemplary embodiment, the RuleStatus field may store a 'Y' indicating that the rule is active, or a 'N' indicating that the rule is inactive. If the RuleStatus field provides an indication that the rule is inactive, the FAE module 116 may not apply the rule to modify the order. The RuleCreatedDate field may identify the time and/or date on which the rule associated with the RuleID was created.

The rules dictionary table entry 308 may store a rule that may be used to modify an order. In an exemplary embodiment, the rules dictionary table entry 308 may include a RuleID field, an Addto field, a ChangeFrom field, a ChangeTo field, a ChangeValueBy field, a DeleteTo field, a Value field, a TagAfter field, a ServiceID field, a Sequence field, a Lookfor field, an Order Type field, a VoiceOrderType field, a DataOrderType field, a VideoOrderType field, and an OrderSignals field. The RuleID field may be the same as the rule identifier from the error description table entry in the error description table entry 302. The AddTo field may identify an element (e.g., text or information) to be added to the order. In an exemplary embodiment, the AddTo field may include an XML tag to be added to the order. The ChangeFrom field may identify an existing value in an order that is to be replaced. In an exemplary embodiment, the ChangeFrom field may identify a value for an XML tag that is to be modified. The ChangeTo field may identify a value that may be used to replace an existing value in the order. In an exemplary embodiment, the ChangeTo field may identify a new value for an XML tag to replace the value included in the ChangeFrom field. The ChangeValuesBy field may hold a tag which is the reference to the values that are to be changed. The ChangeValuesBy field may hold the name of the tag on which the changeFrom and changeTo values are to be manipulated on. For example one:quantity is changeValueBy, 0—changeFrom. 1—changeTo. The DeleteTo field may contain an element (e.g., an XML tag) which is to removed from the order. The Value field may hold a value that is searched in cases of multiple occurrences of an element (e.g., an XML tag). For example, in cases where a product or service is no longer sold, the strValue field may hold the values of G8320, G8321, which are values to be looked up from the pCatID in order to find the replacement values for the good or service which replaced the no longer available good or service. The TagAfter field may identify a location for placing an element when adding the element to the order, and may identify a location from where the element is to be removed when deleting an element. The TagAfter field may hold the value of the preceding element. For example, if a VoiceOrderType tag is being added, the TagAfter field will hold MasterOrderType, which is the preceding tag. The ServiceID field may store a unique identifier of a requested goods and/or service. The Sequence field may list a sequence in which rules are applied if there are more than one rules being applied to modify the order. The LookFor field may store a name of an element (e.g., a tag name) which is to be searched when deleting an element. This may be the tag whose inner text is strValue. In case of the Delete Action to remove a grandfathered product, this field may hold the tag, pCatId from which the strValue, e.g., G8320, is checked and if true, the delete action is performed on the strDeleteTo field. The OrderType field may store an order type of the order. The order type may be specific to the Ordering System in use. An exemplary Ordering System may be the Convergent FrontEnd Engine (CoFEE). The order type may be, for example, an install order; a change order, a move order, or a disconnect order. The VoiceOrderType field may be an order type associated with an order for voice services. The order type may be, for example, an install order; a change order, a move order, or a disconnect order. The DataOrderType may be an order type associated with an order for data services. The order type may be, for example, an install order; a change order, a move order, or a disconnect order. The VideoOrderType may be an order type associated with an order for video services. The order type may be, for example, an install order; a change order, a move order, or a disconnect order. The OrderSignals field may contain a value to be looked for from an OrderSignals tag, which may be specific to the ordering system. The OrderSignals may hold specific information associated with an Account, which may be used to effectively implement a rule. For example, the OrderSignals field may contain DataServiceId and VideoServiceId which are not explicitly present in the request under the same caption.

The transaction table entry 304 may log information about the orders that the FAE module 116 received and modified. In an exemplary embodiment, the transaction table entry 304 may include a MON field, an ErrorDescription field, a Rule Action field, a RuleID field, and a RuleCreatedDate field. The MON (Master Order Number) field may store a unique order number identifier that may be order system dependent. This value may provide the data on the orders handled by the FAE module 116. The ErrorDescription Field may store a description of the error generated by the SSP/NOCV module 112. The RuleAction field may identify the action that may be used to the modify the order. For example, the order may be an object, such as, but not limited to, eXtensible Markup Language (XML) or Continuous text. In an exemplary embodiment, the RuleAction field may include one of four actions: A—Add; D—Delete; C—Change; and N—No Action. The RuleCreatedDate may be automatically updated with a time and/or date of the creation of a rule.

The service table entry 306 may store a unique identifier for every service. In an exemplary embodiment, the service table entry 306 may include a ServiceId field, a Rule Error Description field, and a RuleCreatedDate Field. The ServiceId field may store unique identifiers to uniquely identify a data service; a video service; a data, video, VASIP (Value Added Services Integration Platform) service; a Digital Subscriber Line (DSL) service; other services; a data video service; a data VASIP service; combinations thereof, and/or other goods and/or services that may be provided to a customer. The Rule Error Description field may store a description of a rule and an error that correlates with that particular service. Errors may be associated with certain services or across services. The ServiceId may indicate the services that are associated with that error, thereby reducing the overhead associated with handling a request which is stored across various services. The RuleCreatedDate Field may be automatically updated with a time and/or date of the creation of a rule.

FIG. 4 illustrates error description table entries in an error description table in accordance with exemplary embodiments. Each row in FIG. 4 may represent an error description table entry. In an exemplary embodiment, the error description table entry for the first row may include a RuleID field storing the entry "1," a RuleDescription field storing the entry "orderinfo," a RuleAction field including the entry "Add," a RuleErrorDescription field storing the entry "No input data," a RuleStatus field storing the entry "Y" indicating that the rule is active, and a RuleCreatedDate field storing the entry "Sept. 24, 2007." The error description table entry for the last row may include a RuleID field storing the entry "101," a RuleDescription field storing the entry "quantity," a RuleAction field including the entry "Change," a RuleErrorDescription field storing the entry "Product is not eligible," a RuleStatus field storing the entry "Y" indicating that the rule is active, and a RuleCreatedDate field storing the entry "Oct. 10, 2007." The rule dictionary table entries corresponding to the error description table entries from FIG. 4 are described below with reference to FIG. 5.

FIG. 5 illustrates rule dictionary table entries in a rule dictionary table in accordance with exemplary embodiments. Each row in FIG. 5 may represent a rule dictionary table entry. A first rules dictionary table entry 308 may include a RuleID field storing the entry "1," an Addto field having the entry "voice order type," a ChangeFrom field having the entry "null," a ChangeTo field having the entry "null," a ChangeValueBy field having the entry "null," a DeleteTo field having the entry "null," a Value field having the entry "master order type," a TagAfter field having the entry "orderinfo," a ServiceID field having the entry "3," a Sequence field having the entry "0," a Lookfor field having the entry "null," an Order Type field having the entry "null," a VoiceOrderType field having the entry "null," a DataOrderType field having the entry "null," a VideoOrderType field having the entry "null," and an OrderSignals field having the entry "null." A last rules dictionary table entry may include a RuleID field storing the entry "101," an Addto field having the entry "voice order type," a ChangeFrom field having the entry "G9602," a ChangeTo field having the entry "G9601," a ChangeValueBy field having the entry "null," a DeleteTo field having the entry "null," a Value field having the entry "null," a TagAfter field having the entry "products," a ServiceID field having the entry "3," a Sequence field having the entry "0," a Lookfor field having the entry "null," an Order Type field having the entry "null," a VoiceOrderType field having the entry "null," a DataOrderType field having the entry "null," a VideoOrderType field having the entry "null," and an OrderSignals field having the entry "null."

Considering FIGS. 4 and 5, the error description table entry and the rules dictionary table entry corresponding to ruleID "1" may be used to modify an order to include a master order type value in a voice order type field where SSP/NOCV module 112 identified an error because the order did not specify a voice order type. The error description table entry and the rules dictionary table entry corresponding to ruleID "101" may be used to modify an order to change a value in a products field of the order from a G9602 product that is ineligible for a service to a G9601 product that is eligible for the service. It is noted that FIGS. 4 and 5 are exemplary, and that the fields of FIGS. 4 and 5 may be used to correct other types of errors.

Figure 6:
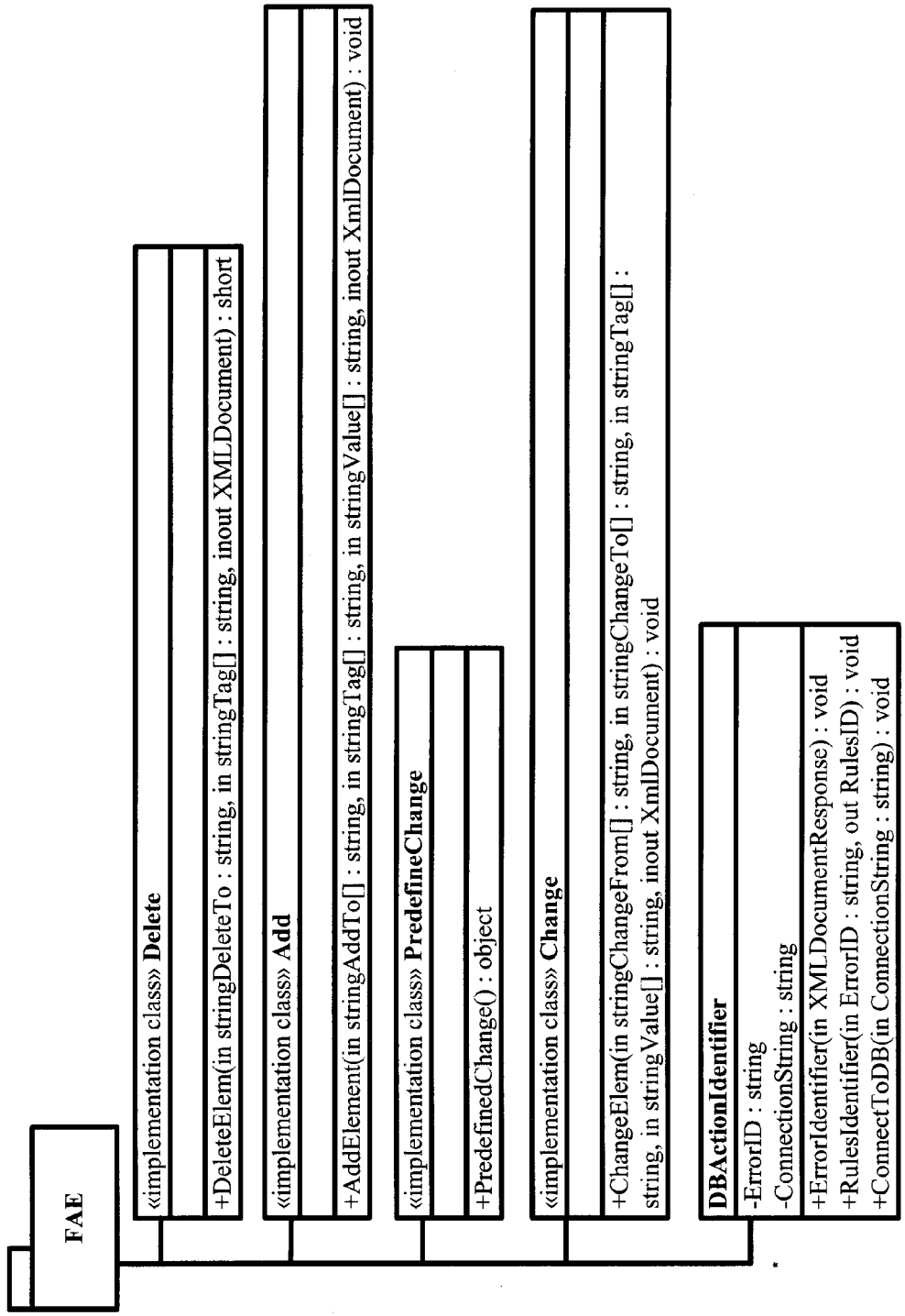
FIG. 6 illustrates various classes that may be called by the Fallout Automation Engine (FAE) module to modify an order in accordance with exemplary embodiments.

FIG. 6 illustrates various classes that may be called by the Fallout Automation Engine (FAE) module to modify an order in accordance with exemplary embodiments. In an exemplary embodiment, the FAE module 116 may call a Delete class to perform a delete action, an add class to perform an add action, a predefinedchange class to perform a predefined change action on the order, and a change class that may perform a change on the order, and also may include a DBActionIdentifier class useable to identify a rule associated with one of the classes based on a Rule Identifier and/or on an Error identifier. The predefined change class may be used as a pattern matching mechanism, so as to have issues, having similar error descriptions, to the already existing rules, to be handled. A change class establishes the action of change based on the rule that exists. In an exemplary embodiment, when the order and the error information is received, the modification module 202 of the FAE module 116 may process the error information to obtain the error identifier. The modification module 202 may query the database 206 based on the error identifier to index the error description table 208. Indexing the error description table 208 may identify an error description table entry associated with the error identifier. The error description table entry may include a rule identifier that may be used to index the rules dictionary table 210 to identify a rules dictionary table entry. The rules dictionary table entry may include an action which may be one of the add, delete, predefined change, or change actions described in FIG. 6. The modification module 202 may call the appropriate class (i.e., add, delete, predefinedchange, or change) to perform the action to modify the order.

Figure 7:
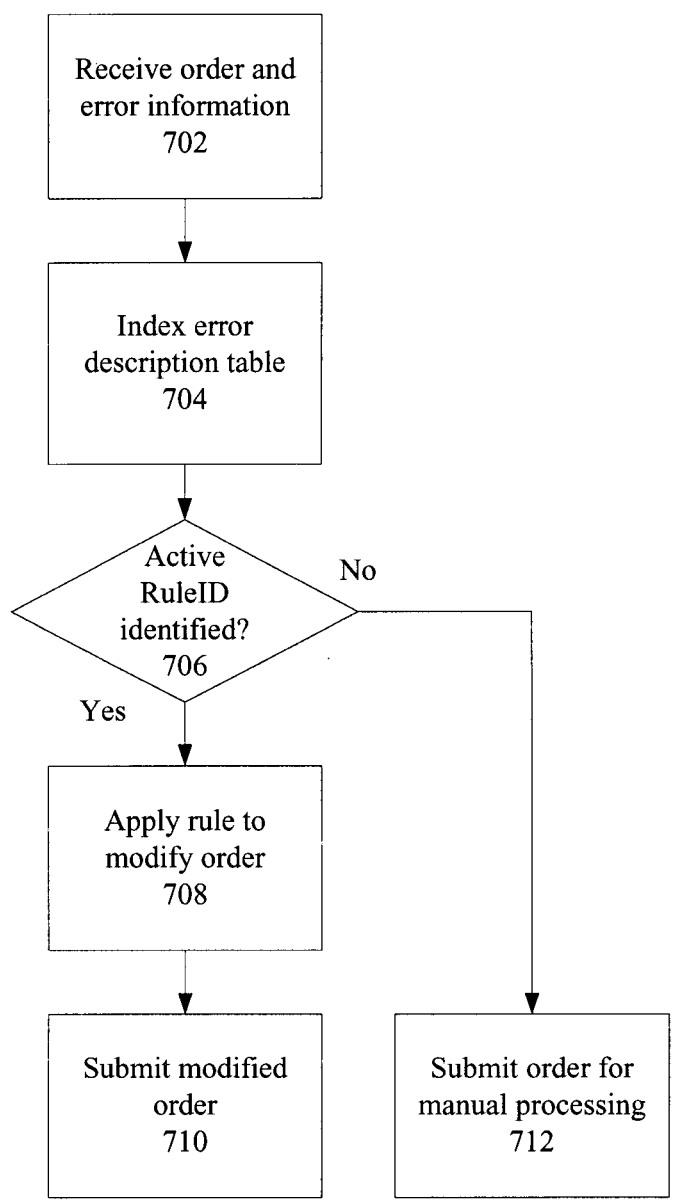
FIG. 7 illustrates a method for automated processing of fallout orders in accordance with exemplary embodiments.

FIG. 7 illustrates a method for automated processing of fallout orders in accordance with exemplary embodiments. This exemplary method 700 is provided by way of example, as there are a variety of ways to carry out methods disclosed herein. The method 700 shown in FIG. 7 can be executed or otherwise performed by one or a combination of various systems. The method 700 is described below as carried out by the system 100 shown in FIG. 1 by way of example, and various elements of the system 100 are referenced in explaining the example method of FIG. 7. Each block shown in FIG. 7 represents one or more processes, methods, or subroutines carried in the exemplary method 700. Referring to FIG. 7, the exemplary method 700 may begin at block 702.

In block 702, the method 700 may include receiving an order and error information. In an exemplary embodiment, the SSP/NOCV module 112 may identify an error in an order and may reject the order. The SSP/NOCV module 112 may communicate the order and the error information to the Coghold module 114. The Coghold module 114 may communicate the order and the error information to the FAE module 116. The FAE module 116 may receive the order and error information. The method 700 may continue to block 704.

In block 704, the method 700 may include indexing an error description table based on an error identifier. In an exemplary embodiment, a modification module 202 of the FAE module 116 may index the error description table 208 of the database 206 based on an error identifier from the error information. The method 700 may continue to block 706.

In block 706, the method 700 may include determining whether an active rule identifier has been identified. In an exemplary embodiment, the modification module 202 of the FAE module 116 may examine a rules dictionary table entry in the rules dictionary table 210 indexed by the error identifier to determine whether the action associated with the rule in the rules dictionary table entry is active. If the action is active, the method 700 may continue to block 708. If the action is not active, the method 700 may continue to block 712.

In block 708, the method 700 may include applying a rule associated with the rules dictionary table entry to modify the order. In an exemplary embodiment, the modification module 202 of the FAE module 116 may retrieve a rule associated with a rule identifier of the rules dictionary table entry. The modification module 202 may apply the rule to modify the order and may communicate the modified order to the submission module 204 of the FAE module 116. The method 700 may continue to block 710.

In block 710, the method 700 may include submitting the modified order for processing. In an exemplary embodiment, the submission module 204 of the FAE module 116 may communicate the modified order to the order submission module 110 of the COG module 108. The order submission module 110 may communicate the modified order to the SSP/NOCV module 112 for processing of the modified order. This branch of the method 700 may end. Returning to block 706, if the action is not active, the method 700 may continue to block 712.

In block 712, the method 700 may include submitting the order and the error information for manual processing. In an exemplary embodiment, the modification module 202 may communicate the order, the error information, and an unmatched indicator to the submission module 204. The unmatched indicator may indicate that the error information does not match any of the error description table entries in the error description table 208 and may instruct the submission module 204 to forward the order and the error information to the SQ module 118 for manual processing by a human operator prior to resubmission of the order to the SSP/NOCV module 112 for processing of the order. The method 700 may then end.

The following describes an example in accordance with exemplary embodiments. In an exemplary embodiment, the FAE module 116 may be a Web Service that references a WINDOWS™ Dynamic Link Library, with a Class for each of the actions (e.g., Add, Delete, Change) that may be used to modify an order that is an XML document. When an order having an error is received, the FAE module 116 may index the error description table 208 based on an error identifier to identify an error description table entry having a rule identifier. The FAE module 116 may retrieve the rule associated with the rule identifier to modify the order based on an action specified by the rule, which may indicate the modifications to apply on the XML order.

The FAE module 116 may instantiate an object of the action and may obtain the parameters used by the action from the database 206. In the case of an error having more that one action to be performed, the FAE module 116 may identify a sequence from a sequence field of the rule dictionary table 210. The FAE module 116 may then modify the order and may send the modified order to the COG module 108 for re-submission to the SSP/NOCV module 112.

Figure 8:
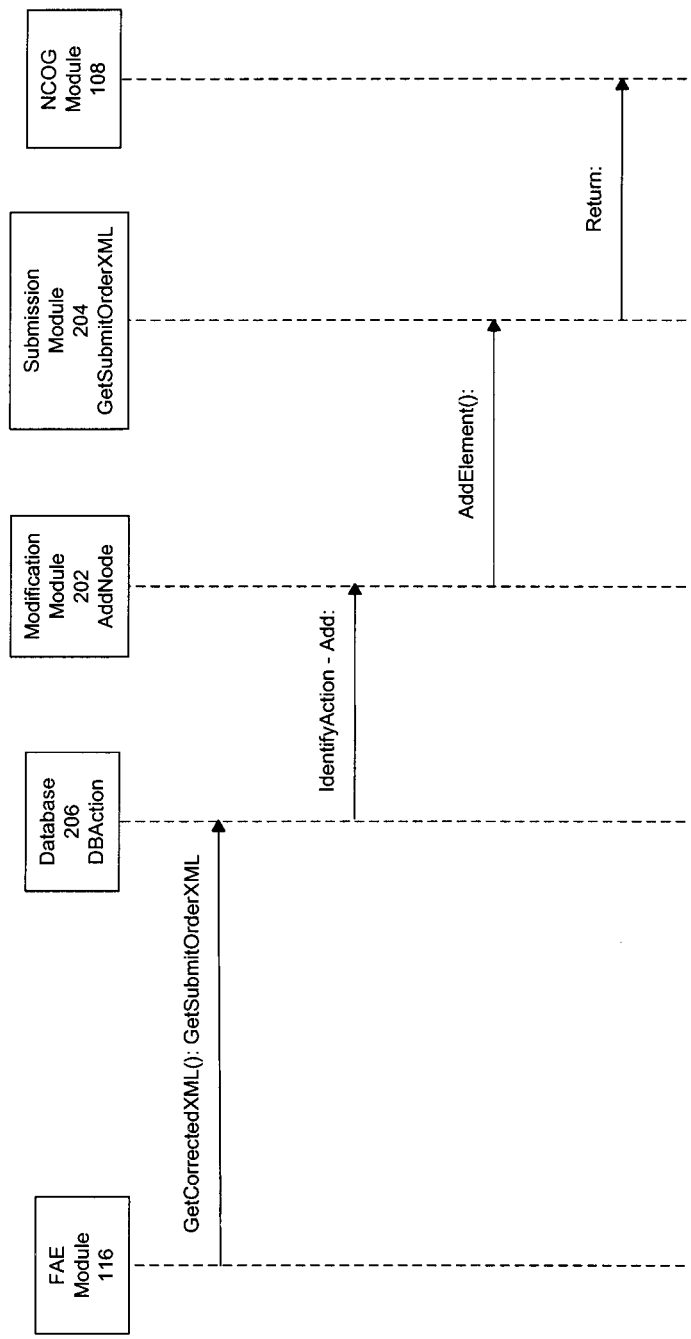
FIG. 8 illustrates a signaling diagram of the signals associated with a rule having an add action in accordance with exemplary embodiments.

FIG. 8 illustrates a signal flow diagram associated with a rule having an add action in accordance with exemplary embodiments. In this example, the FAE module 116 may receive an order and error information associated with the order. The FAE module 116 may generate a GetCorrectedXML( ):GetSubmitOrderXML command to query the database 206 for a rule associated with the error information. The database 206 may then return an error description table entry associated with the error information and a rule that includes an add action. The modification module 202 of the FAE module 116 may revise the order by adding an element to the order (e.g., by adding an XML tag), and may communicate the modified order to the submission module 204. The submission module 204 may then communicate the modified order to the COG module 108.

Figure 9:
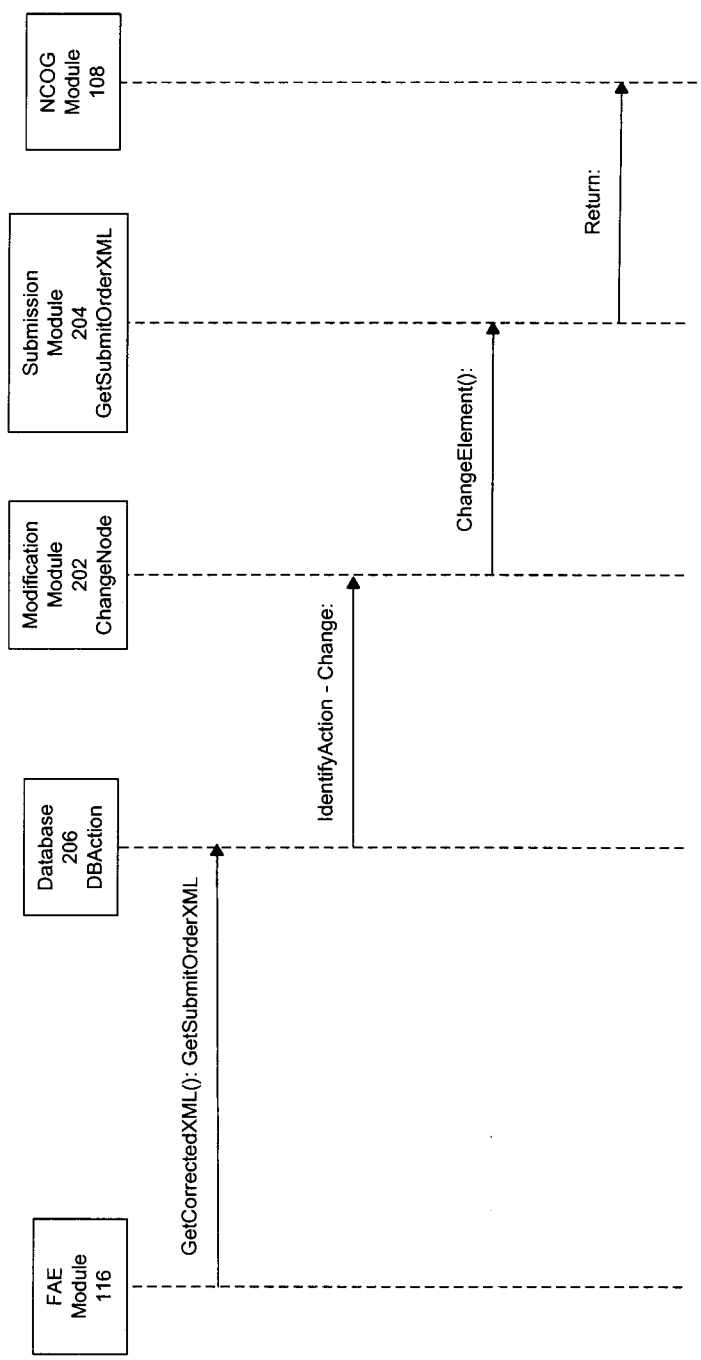
FIG. 9 illustrates a signaling diagram of the signals associated with a rule having a change action in accordance with exemplary embodiments.

FIG. 9 illustrates a signal flow diagram associated with a rule having a change action in accordance with exemplary embodiments. In this example, the FAE module 116 may receive an order and error information associated with the error. The FAE module 116 may generate a GetCorrectedXML( ):GetSubmitOrderXML entry to query the database 206 for an rule associated with the error information. The database 206 may then return an error description table entry associated with the error information and a rule that includes a Change action. The modification module 202 of the FAE module 116 may modify the order by changing an element in the order (e.g., replacing an existing XML tag with a different XML tag), and may communicate the modified order to the submission module 204. The submission module 204 may then communicate the modified order to the COG module 108.

Figure 10:
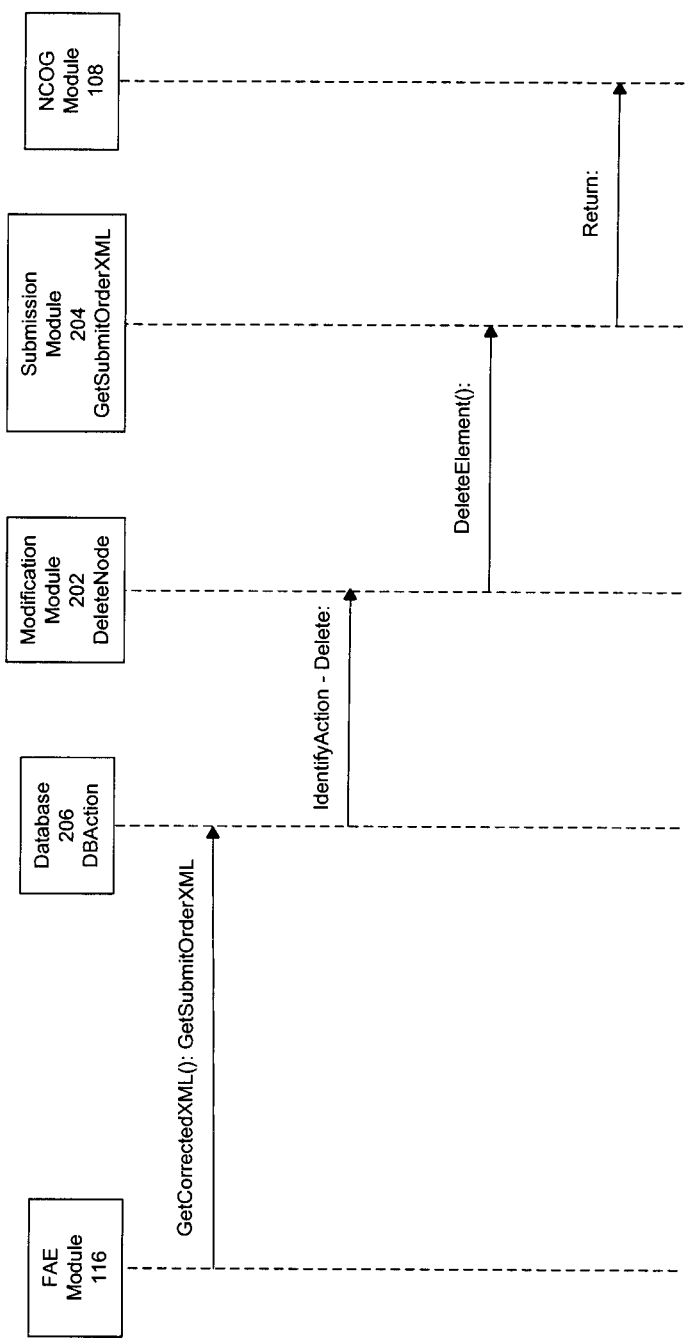
FIG. 10 illustrates a signaling diagram of the signals associated with a rule having a delete action in accordance with exemplary embodiments.

FIG. 10 illustrates a signal flow diagram associated with a rule having a delete action in accordance with exemplary embodiments. In this example, the FAE module 116 may receive an order and error information associated with the error. The FAE module 116 may generate a GetCorrectedXML( ):GetSubmitOrderXML entry to query the database 206 for an rule associated with the error information. The database 206 may then return an error description table entry associated with the error information and a rule that includes a delete action. The modification module 202 of the FAE module 116 may revise the order by deleting an element from the order (e.g., deleting an XML tag), and may communicate the modified order to the submission module 204. The submission module 204 may then communicate the modified order to the COG module 108.

Thus, the system in accordance with exemplary embodiments may provide for automated processing of orders that fallout of an automated processing system. The system may include a Fallout Automation Engine (FAE) module to modify an order in an attempt to correct known problems instead of sending fallout orders to a human operator, thus resulting in reduced costs. The system also advantageously may use a table-based system for storing and for permitting access to the rules, whereby the rules may be updated without requiring that recompilation of the code used by the system. This may result in computational savings for the system.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

The invention claimed is:
1. A method comprising:
receiving an order and an error identifier;
searching an indexed error description table of a database based on the first error identifier to identify a first rule identifier;
searching an indexed rules dictionary table of the database based on the first rule identifier to identify a first rule;
applying the first rule to modify the order to generate a modified order;
submitting the first modified order for processing:;
receiving the first modified order and a second error identifier;
automatically determining whether the first error identifier and the second error identifier indicate the same error prior to submitting a second modified order for processing;
searching the indexed error description table of the database based on the second rule identifier to identify a second rule;
applying the second rule to modify the first modified order to generate the second modified order; and
submitting the second modified order for processing,
wherein each entry of the rules dictionary table comprises a Tag After field that stores data that indicates at least one of a location for placing an element when adding the element to the order and a location for removing an element when deleting from the order.

2. The method of claim 1, wherein the order comprises one of an eXtensible Markup Language document or a text document.

3. The method of claim 1, further comprising determining that the first rule is active.

4. The method of claim 1, wherein the rule is associated with an action.

5. The method of claim 4, wherein the action is at least one of adding, deleting, and changing an element in the order.

6. The method of claim 1, wherein the database is updateable to at least one of modify, add, and delete the rule.

7. The method of claim 1, wherein the database comprises an error description table that is indexable by the first error identifier to identify the rule identifier.

8. The method of claim 1, wherein the database comprises the rules dictionary table that is indexable by the rule identifier to identify the first rule.

9. The method of claim 1, wherein the database comprises a services table that stores at least one unique identifier for a good and/or service.

10. The method of claim 1, wherein the database comprises a transaction table that may log information about modifications performed on the order.

11. A computer readable media comprising code to perform the acts of the method of claim 1.

12. The method of claim 1, wherein each entry of the error description table comprises a Rule Status field that stores data that indicates whether a rule is active.

13. The method of claim 1, wherein each entry of the error description table comprises a Rule Created Data field that stores data that indicates a creation data associated with a rule.

14. The method of claim 1, wherein each entry of the rules dictionary table comprises a Sequence field that stores data that indicates a sequence in which a plurality of rules are to be applied to the order.

15. The method of claim 1, wherein each entry of the rules dictionary table comprises fields selected from a group consisting of: (1 )a value field; (2 )a Look For field; (3 ) an Order Type field; (4 ) a Voice Order Type field; (5 ) a Data Order Type field; (6 ) a Video Order Type field; and (7 ) an Order signals field.

16. A system comprising:
an order processor computing apparatus to generate an order, comprising a non-transitory storage medium;
a processing server communicatively coupled to the order processor computing apparatus, the processing server to process the order, to identify a first error with the order and to generate a first error identifier;
a fallout automation engine computing apparatus communicatively coupled to the processing server, the fallout automation computing apparatus configured to search an indexed error description table of a database using the first error identifier to access a first rule in an indexed rules dictionary table of the database, to apply the first rule to the order to modify the order to generate a first modified order, and to submit the first order to the processing server;
wherein the processing server is also configured to process the first modified order, to identify a second error with the first modified order, to automatically determine whether the second error is different from the first error prior to submitting the second modified order to the processing server, and to generate the second error identifier; and
wherein the fallout automation engine computing is also configured to search the indexed error description table of the database using second error identifier to access a second rule in the indexed rules dictionary table to the database, to apply the second rule to the order to modify the order to generate a second modified order, and to submit the second modified order to the processing server, and
wherein each entry of the rules dictionary table comprises a Tag After field that stores data that indicates at least one location for placing an element when adding the element to the order and a location for removing an element when deleting the element from the order.

17. The system of claim 16, wherein the second error is the same error as the first error.

18. The system of claim 17, further comprising a manual processing module to permit an operator to manually modify the order.

19. The system of claim 18, wherein the processing server communicates the first modified order and second error information to the manual processing module to permit a human to manually process the first modified order.

20. The system of claim 16, wherein the processing server successfully process the second modified order.

21. The system of claim 16, wherein each entry of the error description table comprises a Rule Status field that stores date that indicates whether a rule is active.

22. The system of claim 16, wherein each entry of the error description table comprises a Rule Created Date field that stores data that a creation date associated with a rule.

23. The system of claim 16, wherein each entry of the rules dictionary table comprises a Sequence field that stores data that indicates a sequence in which a plurality of rules are to be applied to the order.

24. The system of claim 16, wherein each entry of the rules dictionary table comprises fields selected from a group consisting of: (1) a Value field; (2) a Look for field; (3) an Order Type field; (4) a Voice Type field; (5) a Data Order Type field; (6) a Video Order Type field; and (7) an Order Signals field.

25. A system comprising;
a modification computing apparatus comprising a non-transitory storage medium, the modification computing apparatus configured to receive an order and a first error identifier, to search an indexed error description table of a database using identifier to identify a first rule identifier, to search an indexed rules dictionary table of the database using the first rule identifier to identify a first rule, and to apply the first rule to modify the order to generate a first modified order;
a submission computing apparatus communicatively coupled to the modification computing apparatus, the submission computing apparatus configured to receive the first modified order and to submit the first modified order for processing;
the modification computing apparatus further configured to receive the first modified order and a second error identifier, to automatically determine whether the second error identifier is different from the first error identifier prior to submitting the second order for processing, to search the indexed error description table of a database using the second error identifier to identify a second rule identifier, to search the indexed rules dictionary table of the database using the second rule identifier to identify a second rule, and to apply the second rule to modify the first modified order to generate a second modified order; and
the submission computing apparatus configured to receive the second modified order and to submit the second modified order for processing,
wherein each entry of the rules dictionary table comprises a Tag after field that stored data that indicates at least one of a location for placing an element when adding the element to the order and a location for removing an element when deleting the element from the order.

26. The system of claim 25, further comprising an update information module, the update module configured to receive update information, where the update information is usable to at least one of add, delete, and modify the rule.

* * * * *